Oct. 23, 1962  A. WEINER  3,059,654
BEARING WASHER
Filed Sept. 2, 1960  3 Sheets-Sheet 1

Al Weiner
INVENTOR.

BY Clarence A. O'Brien
and Harvey B. Jacobson
Attorneys

Oct. 23, 1962  A. WEINER  3,059,654
BEARING WASHER
Filed Sept. 2, 1960  3 Sheets-Sheet 2
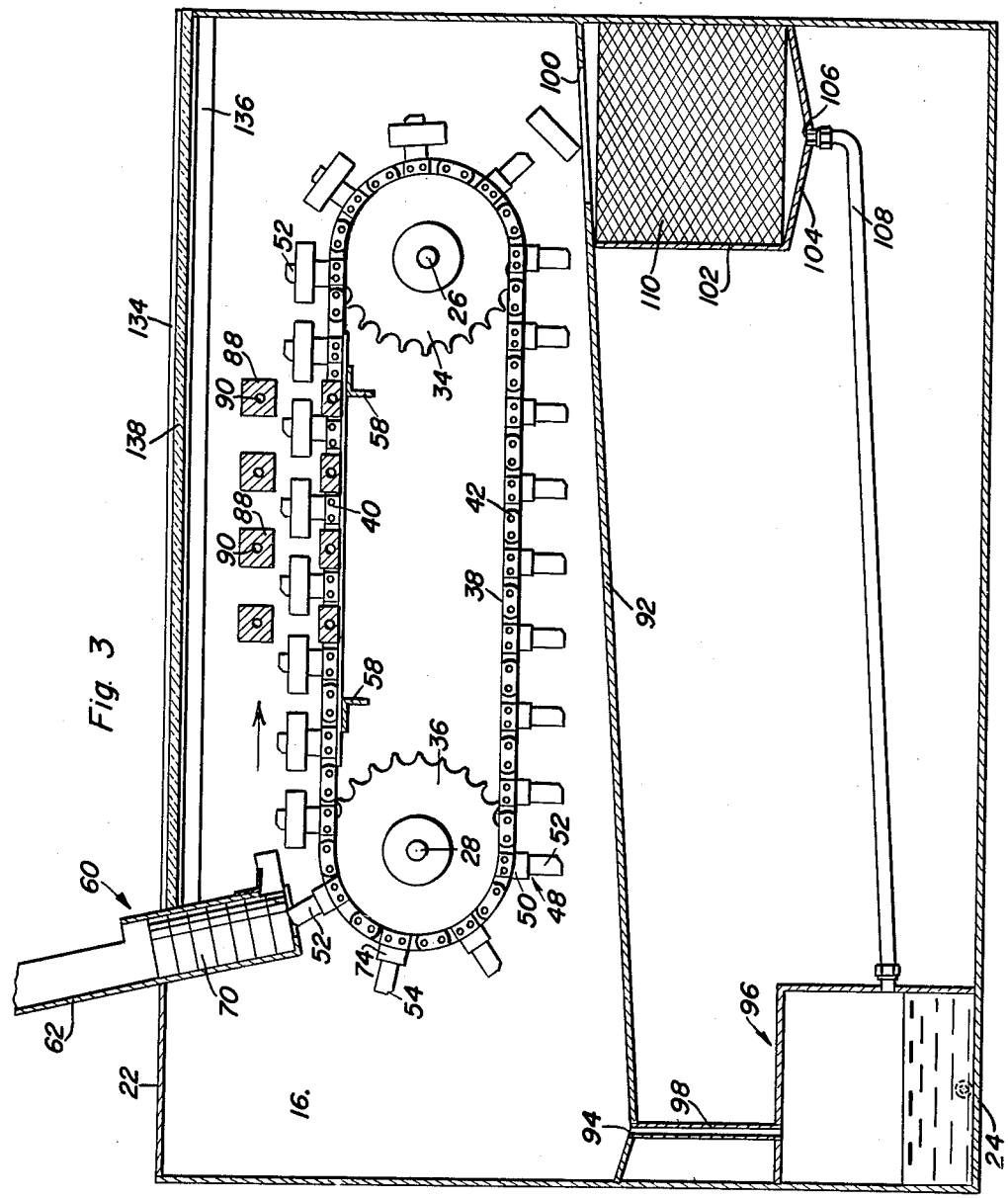
Al Weiner
INVENTOR.

Oct. 23, 1962  A. WEINER  3,059,654
BEARING WASHER
Filed Sept. 2, 1960  3 Sheets-Sheet 3

Al Weiner
INVENTOR.

BY
Attorneys

United States Patent Office 3,059,654
Patented Oct. 23, 1962

3,059,654
BEARING WASHER
Al Weiner, 1430 21st St., Miami Beach, Fla.
Filed Sept. 2, 1960, Ser. No. 53,700
8 Claims. (Cl. 134—116)

This invention relates to a novel and useful bearing washer, and more particularly to a bearing washer employing the use of a conveyor adapted to pass beneath a magazine having a plurality of bearings disposed therein and to withdraw bearings from the magazine and move them past a fluid discharge means adjacent the conveyor provided with nozzles for directing streams of fluid under pressure in the path of the bearings carried by the conveyor whereby the bearings may be cleaned.

Although machines for mechanically washing and cleaning roller and ball bearings have previously been devised such as that disclosed in the patent to Rustin, No. 2,603,228, dated July 15, 1952, these previous attempts of providing bearing washers have not resulted in the provision of a mechanical device adapted to automatically and individually clean a plurality of bearings. In order to provide a device capable of washing a plurality of bearings with a minimum amount of manual labor it is necessary to provide a device whereby a plurality of bearings may be assembled in a hopper or the like and moved individually to a washing station and then to a collection point for collecting the cleaned bearings. With this type of apparatus, a large number of bearings may be placed in the storage hopper for the bearings to be cleaned and the machine may be then operated until all of the bearings have been cleaned and deposited in the collection area for the cleaned bearings. With an automatic machine of this type, a workman is needed merely to occasionally fill the hopper for the bearings to be cleaned and remove the cleaned bearings from the collection point.

The main object of this invention is to provide a bearing washer having a magazine in which a plurality of bearings to be washed may be placed with a conveyor assembly provided with bearing engaging means thereon for individually withdrawing bearings from the magazine whereby the bearings withdrawn from the magazine may then pass a cleaning point and then on to the collection point for the cleaned bearings.

A further object of this invention, in accordance with the immediately preceding object, is to provide a cleaning point for the bearing washer having a plurality of cleaning stations spaced longitudinally of the conveyor whereby each bearing passing the cleaning point will be subjected to a plurality of cleaning processes.

Still another object, in accordance with the preceding objects, is to provide each cleaning station with means for directing a stream of cleaning fluid under pressure in a direction whereby each bearing passing the cleaning station will be rotated in order to assist in the cleaning operation.

Another object of this invention is to direct the streams of cleaning fluid at each cleaning station in a direction whereby a bearing passing thereby will first be rotated in one direction and then rotated in the opposite direction.

Yet another object of this invention is to provide a means for collecting the spent fluid from each of the cleaning stations and directing this collected fluid to a fluid reservoir to be subsequently pumped back through the cleaning stations.

Another object of this invention is to provide a means for filtering the cleaning fluid each time it passes through the cleaning stations.

Another object of this invention is to provide a means whereby drippings from the cleaned bearings in a collection point may be directed back to the fluid reservoir.

Still another object of this invention is to provide a bearing washer having only one moving assembly, that being the conveyor for conveying the bearings past the cleaning point, other than a suitable pump means for delivering cleaning fluid under pressure to the cleaning station.

A final object to be specifically enumerated herein is to provide a bearing washer which will conform to conventional forms of manufacture, be of simple construction and efficient in its operation whereby a device will be provided which is economically feasible, long lasting and highly efficient.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a longitudinal vertical sectional view of the bearing washer on somewhat of an enlarged scale taken substantially upon a plane in which the conveyor is disposed, parts of the bearing washer being broken away;

Figure 1:
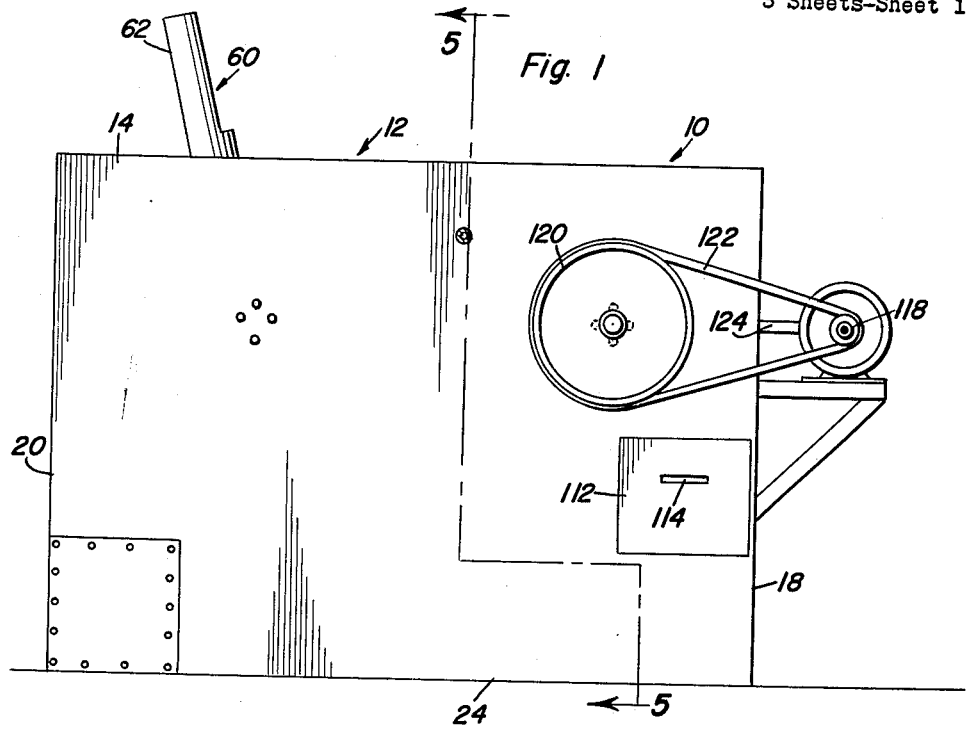
FIGURE 1 is a side elevational view of the bearing washer comprising the instant invention.
Figure 2:
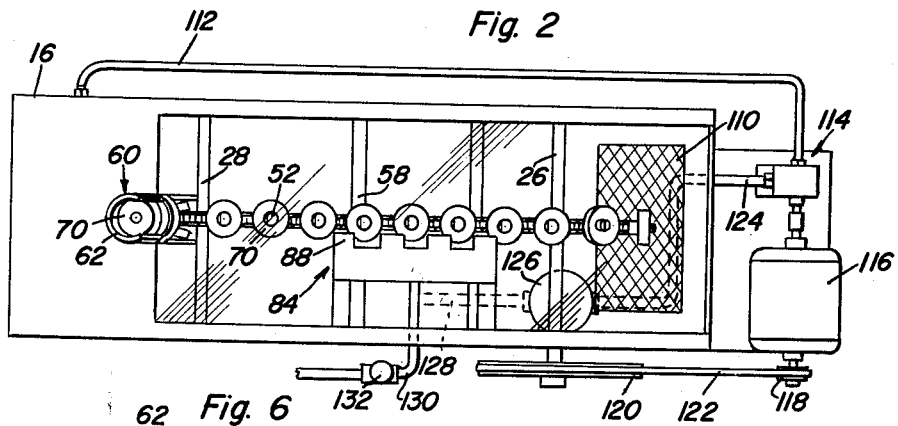
FIGURE 2 is a top plan view of the bearing washer shown in FIGURE 1.
Figure 6:
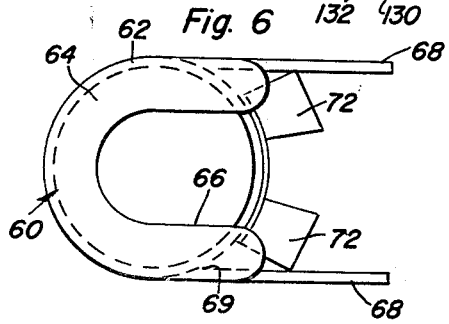
FIGURE 6 is a bottom plan view of the magazine for storing a plurality of bearings to be engaged by the conveyor mechanism and moved past the fluid manifold for washing.

Referring now to the drawings and to FIGURES 1–3 in particular, it will be seen that the bearing washer comprising the present invention is generally designated by the reference numeral 10. The washer 10 includes a generally hollow rectangular housing 12 including opposite side walls 14 and 16 and opposite end walls 18 and 20 interconnected by means of a top wall 22 and a bottom wall 24. A pair of horizontally disposed and transversely extending shafts 26 and 28 are journaled for rotation between the opposite side walls 14 and 16 by means of bearing journals 30 secured to the inner surfaces of the side walls 14 and 16 by means of suitable fasteners 32.

The shafts 26 and 28 are provided with centrally disposed sprocket wheels 34 and 36 respectively which are aligned and have entrained thereabout an endless chain 38. The shafts 26 and 28 are horizontally aligned and the endless chain 38 includes vertically spaced and generally parallel upper and lower reaches 40 and 42 respectively. The endless chain 38 includes a plurality of pivotally interconnected links 44, see FIGURE 4, some of which are spaced apart longitudinally of the chain 38 and are interconnected by means of a saddle member 46 carried by the lower end of a bearing engaging element generally designated by the reference numeral 48. The bearing engaging elements 48 are spaced longitudinally of the chain 38 and each includes a post member 50 having a diametrically reduced outer end portion 52. The free end of each of the diametrically reduced outer end portions 52 is provided with a bevel 54 for a purpose to be hereinafter more fully set forth.

Disposed beneath the upper reach 40 of the chain 38 and upon which the upper reach 40 is slidingly disposed is a chain support 54 which includes an upstanding longitudinally extending guide rib 56. The side straps 58 of each of the chain links 44 embrace the opposite sides of the rib 56 whereby the chain 38 is guided against lateral movement. The support 54 is supported at its opposite ends by means of transverse brace members 58 secured between the opposite sides 14 and 16 of the housing 12 in any convenient manner.

A magazine generally designated by the reference numeral 60 is supported by the top wall 22 and includes a cylindrical sleeve 62 disposed in an upright position. The bottom of the sleeve 62 is provided with a partial bottom wall 64 having a U-shaped opening 66 formed therein opening toward one side wall of the sleeve 62 and in the direction of travel of the upper reach 40 of the chain 38. The lower end of the sleeve 62 is also provided with a pair of generally parallel guide arms 68 which extend from opposite sides of the sleeve 62 and in the direction of movement of the upper reach 40 of the chain 38. An opening is formed in the lower edge of the wall of the sleeve 62 disposed between the arms 68. A plurality of bearings 70 may be disposed in the magazine 62 and, with attention directed to FIGURE 3, it will be noted that each post 50 as it passes beneath the sleeve 62 will engage the lowermost bearing 70 disposed in the sleeve 62 and withdraw it from the sleeve 62 through the opening 69 formed between the arms 68.

The magazine 62 is further provided with a pair of spring arms 72 which project outwardly and laterally of the sleeve 62 between the arms 68 and above the opening 69 to guide the bearings 70 as they are withdrawn from the magazine 60.

It will be noted that each of the posts 50 is provided with an annular radially extending shoulder 74 defining the diametrically reduced outer end portion 52. The inner race 76 of each bearing 70 abuts the shoulder 74 of the post on which it is disposed and limits downward movement of the bearing 70 on that post thereby positioning the bearing above the chain 38 and supporting the bearing 70 by means of its inner race 76 whereby the bearing cage 78 and the outer race 80 are free of contact with any part of the conveyor chain 38.

Supported within the housing 12 by means of suitable bracing 82 is a fluid discharge means including a fluid manifold generally referred to by the reference numeral 84. The fluid manifold 84 includes a longitudinal bore 86 and a plurality of laterally projecting nozzles 88. The nozzles 88 are disposed in longitudinally spaced pairs of upper and lower nozzles. The upper and lower nozzles of each pair of nozzles are adapted to receive therebetween the outer marginal portion of each bearing 70 carried by the conveyor chain 38 past the fluid manifold 84. The nozzles 88 each have outlet conduits 90 formed therein which are in communication with the longitudinal bore 86.

Figure 4:
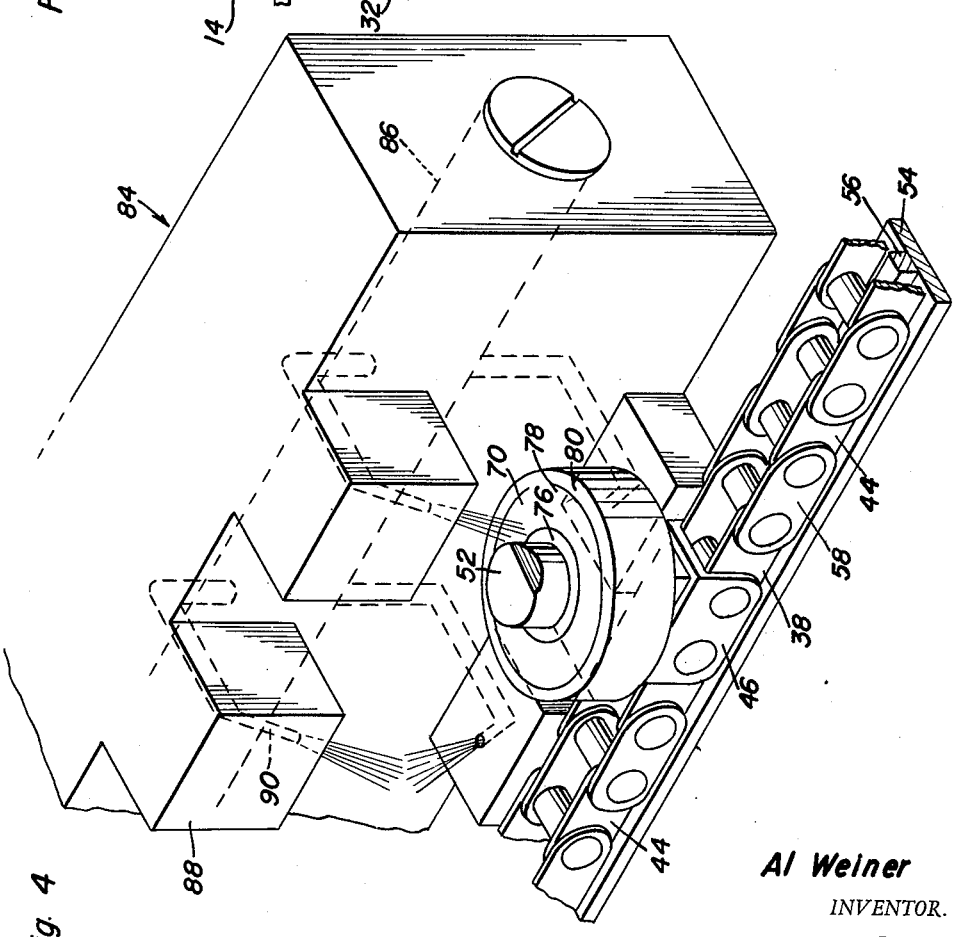
FIGURE 4 is a fragmentary enlarged perspective view of the portion of the conveyor mechanism and the fluid manifold of the bearing washer showing the manner in which the conveyor is utilized to move a bearing past the fluid manifold and in alignment with streams of cleaning fluid being directed therefrom.

It will be noted that the outlet passages or conduits 90 are disposed at an angle relative to the conveyor chain 38 whereby they will effect rotation of each bearing 70 as it is moved in registry with the passages 90. By angling the passages 90 as shown in FIGURE 4 of the drawings, as a bearing 70 approaches one pair of passages 90 the stream of fluid emitted therefrom will effect rotation of the bearing in one direction and further movement of the bearing 70 past the passages 90 will effect rotation of the bearing 70 in the opposite direction.

The housing 12 is provided with an inclined false bottom 92 for collecting fluid dispensed through the passages 90. The false bottom 92 has an outlet opening 94 at its lower end communicated with a reservoir generally designated by the reference numeral 96 supported by the bottom wall 24 by means of a conduit 98.

The upper end of the false bottom 92 is provided with an opening 100 immediately beneath the outer end of the sprocket 34 and in alignment with the bearings 70 as they drop from engagement with the posts 50 upon movement of the latter to an inverted position in the lower reach 42 of the conveyor chain 38.

A box-like receptacle generally referred to by the reference numeral 102 is formed in the housing 12 immediately beneath the opening 100. The receptacle 102 includes a bottom wall 104 having an outlet opening 106 formed therein which is communicated with the interior of the fluid reservoir 96 by means of conduit 108. An opening (not shown) is formed in the side wall 14 in alignment with the receptacle 102 for enabling the positioning of a wire or mesh drawer 110 having an outer end wall 112 provided with a handle 114 within the receptacle 102 for receiving bearings 70 which have been washed.

The reservoir 96 is provided with an outlet conduit 112 whose end remote from the reservoir 96 is communicated with the interior of a pump assembly generally referred to by the reference numeral 114 and driven by means of any suitable motor means 116. The motor means 116 is also provided with a pulley 118 aligned with a pulley 120 secured to a projecting end of the shaft 26. A flexible belt 122 is entrained about the pulleys 118 and 120 whereby the conveyor chain 38 is drivingly connected to the motor 116.

The outlet opening of the pump 114 has one end of a delivery conduit 124 secured thereto. The other end of the delivery conduit 124 is operatively connected to the inlet opening of a filter 126 whose outlet is communicated with the longitudinal bore 86 by means of conduit 128.

Also communicated with the longitudinal bore 86 is one end of air pressure line 130 having a control valve 132 disposed therein. The other end of the air pressure line 130 may be connected to any suitable source of compressed air.

Figure 5:
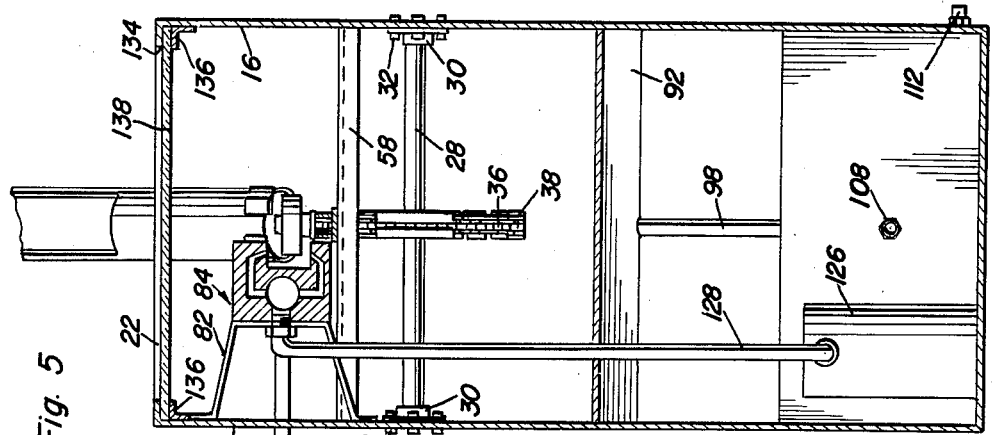
FIGURE 5 is a somewhat enlarged transverse vertical sectional view taken substantially upon the plane indicated by the section line 5—5 of FIGURE 1.

With attention now directed to FIGURES 3 and 5 of the drawings it will be noted that the top wall 22 of the housing 12 is provided with a longitudinally extending opening 134. A pair of supporting flanges 136 are carried by the upper ends of the side walls 14 and 16 of the housing 12 and a transparent panel 138 has its longitudinal side edges supported by the supporting flanges 136 whereby the panel 138 may be slid out of position within the opening 134 in the direction of movement of the upper reach 40 of the conveyor chain 38.

In operation, a plurality of bearings 70 are positioned within the sleeve 62 of the magazine 60 and the motor 116 is started to drive both the conveyor chain 38 and the pump 114. The movement of the conveyor chain will pass the posts 50 beneath the lower end of the sleeve 62 whereupon the outer free end of each post 50, upon passing beneath the sleeve 62, will engage the inner race 70 and withdraw the lowermost bearing within the sleeve 62 forwardly from the sleeve 62 through the opening 69. After each bearing has been withdrawn from the magazine 60, it will fall by gravity to a rest position with the inner race 76 abutting the shoulder 74. Further movement of the bearing along the upper reach 40 will pass the bearing between the pairs of upper and lower nozzles 88 whereupon the streams of cleaning fluid ensuing from the passages 90 will first effect rotation of the bearing cage 78 and outer race 80 of each bearing 70 in one direction and then in the other direction as the center of the bearing 70 moves past the streams of cleaning fluid effected by each pair of upper and lower nozzles 88. As the bearings supported by the posts 50 pass around the sprocket 34, the bearings will fall by gravity from engagement with the posts 50 through the opening 10 in the false bottom wall 92 and into the basket 110.

The drippings of fluid from the cleaned bearings within the basket 110 will pass through the conduit 108 and back into the reservoir 96.

It is to be noted that the bevel 54 on each post 50 is provided to prevent the post 50 from binding within the inner race 76 of each bearing 70 as that bearing is withdrawn from the magazine 60.

It is to be understood that the most efficient speed of the conveyor chain 38 is approximately two feet per minute. Additionally, the manifold 84 is utilized to mix air under pressure of approximately 100 pounds per square inch with filtered cleaning fluid from the pump 114 at 25 pounds per square inch.

It will be noted that there are four pairs of nozzles 88 provided and therefore that each bearing 70 passing the manifold 84 will be rotated in opposite directions eight times thereby insuring that all of the foreign material will be spun and washed from the bearing cage 78 and the confronting surfaces of the inner and outer races 76 and 80.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A bearing washer comprising a conveyor, a bearing magazine adjacent said conveyor, bearing engaging elements carried by and spaced longitudinally along said conveyor for withdrawing bearings singly from said magazine and securing said withdrawn bearings to said conveyor for movement therewith, fluid discharge means adjacent said conveyor including nozzle means for directing a stream of fluid under pressure transversely of said conveyor for cleaning bearings carried by said engaging elements, a liquid reservoir and conduit means for delivering fluid from said reservoir to said fluid discharge means, pump means disposed in said conduit means whereby fluid may be delivered to said fluid discharge means under pressure, fluid collection and return means for returning fluid dispensed from said discharge means to said fluid reservoir, said conveyor including a discharge end, a bearing receiving station including collecting means supported to receive bearings discharged from said conveyor, said station including fluid collection means and return means for returning fluid dripping from collected bearings to said fluid reservoir.

2. A bearing washer comprising a conveyor, a bearing magazine adjacent said conveyor, bearing engaging elements carried by and spaced longitudinally along said conveyor for withdrawing bearings singly from said magazine and securing said withdrawn bearings to said conveyor for movement therewith, fluid discharge means adjacent said conveyor including nozzle means for directing a stream of fluid under pressure transversely of said conveyor for cleaning bearings carried by said engaging elements, said bearing engaging elements each comprising a post projecting outwardly from said conveyor and having a free end portion adapted to be received within the center opening formed through the inner race of a bearing, said free end portion comprising a diametrically reduced portion of said post defined by a radially extending shoulder between said free end portion and the other end portion of said post, said shoulders each comprising a stop surface for engagement by an end of the inner race of a bearing for limiting movement of the latter on said posts toward said conveyor whereby the outer race and cage of a bearing supported on one of said posts will be free of contact with the latter.

3. The combination of claim 2 wherein said conveyor comprises an endless flexible member disposed about two spaced and aligned pulleys and arranged in two substantially horizontally disposed and vertically spaced reaches between said pulleys, said magazine including a sleeve for receiving stacked bearings with its lower end positioned above one of said pulleys and in alignment with the line of movement of said posts, a partial bottom wall carried by the lower end of one wall of said sleeve adapted to engage and support a portion of the outer marginal surfaces of the outer race of the lowermost bearing in said magazine, and an opening in the lower end of the opposite wall of said sleeve whereby the lowermost bearing in said sleeve may be moved radially therefrom, and means supporting said sleeve above a curved portion of said conveyor disposed about one of said pulleys immediately adjacent the approach end of said upper reach with the lowermost bearing in said magazine disposed in the curved path of the free ends of said posts whereby each post passing beneath said magazine will engage the inner race of the lowermost bearing and withdraw the same from said magazine.

4. The combination of claim 3 wherein said fluid discharge means includes a manifold, said nozzle means including at least one pair of upper and lower nozzles communicated with interior of said manifold and adapted to receive therebetween bearings carried by said endless flexible members.

5. The combination of claim 4 wherein said upper and lower nozzles are each positioned to direct a stream of fluid under pressure in a direction to effect rotation of a bearing in one direction upon initial movement of the bearing in alignment with said streams of fluid and then in the opposite direction upon further movement of the bearing away from alignment with said streams of fluid.

6. A bearing washer comprising a conveyor, a bearing magazine adjacent said conveyor, bearing engaging elements carried by and spaced longitudinally along said conveyor for withdrawing bearings singly from said magazine and securing said withdrawn bearings to said conveyor for movement therewith, fluid discharge means adjacent said conveyor including nozzle means for directing a stream of fluid under pressure transversely of said conveyor for cleaning bearings carried by said engaging elements, said bearing engaging elements each comprising a post projecting outwardly from said conveyor and having a free end portion adapted to be received within the center opening formed through the inner race of a bearing, said free end portion comprising a diametrically reduced portion of said post defined by a radially extending shoulder between said free end portion and the other end portion of said post, said shoulders each comprising a stop surface for engagement by an end of the inner race of a bearing for limiting movement of the latter on said posts toward said conveyor whereby the outer race and cage of a bearing supported on one of said posts will be free of contact with the latter, said conveyor comprising an endless flexible member disposed about two spaced and aligned pulleys and arranged in two substantially horizontally disposed and vertically spaced reaches between said pulleys, said magazine including a sleeve for receiving stacked bearings with its lower end positioned above one of said pulleys and in alignment with the line of movement of said posts, a partial bottom wall carried by the lower end of one wall of said sleeve adapted to engage and support a portion of the outer marginal surfaces of the outer race of the lowermost bearing in said magazine, and an opening in the lower end of the opposite wall of said sleeve whereby the lowermost bearing in said sleeve may be moved radially therefrom, and means supporting said sleeve above a curved portion of said conveyor disposed about one of said pulleys immediately adjacent the approach end of said upper reach with the lowermost bearing in said magazine disposed in the curved path of the free ends of said posts whereby each post passing beneath said magazine will engage the inner race of the lowermost bearing and withdraw the same from said magazine, said fluid discharge means including a manifold, said nozzle means including at least one nozzle communicating with the interior of said manifold and adapted to direct a stream of liquid on each bearing carried by said endless flexible member as it passes by said manifold.

7. The combination of claim 6 wherein said nozzle is positioned to direct a stream of fluid in a direction to effect rotation of a bearing passing thereby first in one direction and then in the opposite direction.

8. The combination of claim 6 wherein said manifold includes means for admitting thereinto air under pressure for mixing with the liquid from said reservoir.

References Cited in the file of this patent

UNITED STATES PATENTS

| | | |
|---|---|---|
| 1,026,755 | Lundin | May 21, 1912 |
| 1,512,918 | Forsgard | Oct. 28, 1924 |
| 1,660,345 | Merseles | Feb. 28, 1928 |
| 1,894,786 | Pew | Jan. 17, 1933 |
| 1,989,562 | Smith | Jan. 29, 1935 |
| 2,198,036 | Isted | Apr. 23, 1940 |
| 2,664,901 | Gehr | Jan. 5, 1954 |